(12) United States Patent
Volokh

(10) Patent No.: US 8,079,790 B2
(45) Date of Patent: Dec. 20, 2011

(54) METHOD FOR MAKING BY ASSEMBLING A TOOL TO AND IN A TOOL HOLDER, AND THE TOOL AND TOOL HOLDER, AND THE ASSEMBLED TOOL AND TOOL HOLDER

(75) Inventor: Vladimir Volokh, Ma'alot (IL)

(73) Assignee: Hanita Metal Works, Ltd., Shlomi (IL)

( * ) Notice: Subject to any disclaimer, the term of this patent is extended or adjusted under 35 U.S.C. 154(b) by 1036 days.

(21) Appl. No.: 11/865,225

(22) Filed: Oct. 1, 2007

(65) Prior Publication Data

US 2008/0085165 A1 Apr. 10, 2008

Related U.S. Application Data

(63) Continuation-in-part of application No. PCT/IL2006/000352, filed on Mar. 19, 2006.

(30) Foreign Application Priority Data

Mar. 29, 2008 (IL) .......................................... 167735

(51) Int. Cl.
*B23C 5/22* (2006.01)
*B23P 11/02* (2006.01)
(52) U.S. Cl. ......... 409/234; 279/102; 279/137; 279/141
(58) Field of Classification Search .................. 409/234, 409/232; 279/102, 103, 137, 141; 82/160; 29/447
See application file for complete search history.

(56) References Cited

U.S. PATENT DOCUMENTS

| 5,311,654 A | 5/1994 | Cook |
| 5,873,678 A | 2/1999 | Moses |
| 5,873,687 A | 2/1999 | Watanabe |
| 5,979,912 A | 11/1999 | Cook |
| 6,234,729 B1 | 5/2001 | Cook |
| 6,260,858 B1 | 7/2001 | DeLucia |
| 6,315,506 B1 | 11/2001 | Mizoguchi |
| 6,394,466 B1 | 5/2002 | Matsumoto et al. |
| 6,511,077 B1 | 1/2003 | Voss et al. |
| 6,595,528 B2 | 7/2003 | Voss |
| 2003/0075879 A1 | 4/2003 | Lundblad et al. |

FOREIGN PATENT DOCUMENTS

JP 03-154722 A * 7/1991

(Continued)

OTHER PUBLICATIONS

English translation of Japanese Office Action 2008-503678.

(Continued)

*Primary Examiner* — Erica E Cadugan
(74) *Attorney, Agent, or Firm* — Larry R. Meenan

(57) ABSTRACT

A method for making by assembling a tool to and in a tool holder, and the tool and tool holder, and the assembled tool and tool holder. The tool is shrink-fitted into a cylindrical bore of the tool holder, and a shoulder of the tool abuts an abutment face of the tool holder. Structure, such as press, a screw, a draw bolt, or a cylinder, for example, is provided to apply an axial force to the cutting tool to force the tool shoulder against the abutment face of the tool holder.

5 Claims, 5 Drawing Sheets

FOREIGN PATENT DOCUMENTS

| | | |
|---|---|---|
| JP | 5212606 | 8/1993 |
| JP | 2000233312 | 8/2000 |
| JP | 2001-009615 A * | 1/2001 |
| JP | 2001-138163 A * | 5/2001 |
| JP | 2003517940 | 6/2003 |
| JP | 2003-225823 A * | 8/2003 |
| JP | 2004-142078 A * | 5/2004 |

OTHER PUBLICATIONS

Standard ANSI B4.3—1978: "General Tolerances for Metric Dimensioned Products." American Society of Mechanical Engineers, 2004.

International Search Report PCT/IL2006/00352.

* cited by examiner

Embodiment of the Invention including a Removable Drawbolt, and Wherein the Diameter of the Cutting Portion of the Cutting Tool is Substantially the Same as the Diameter of the Shoulder Portion

FIG. 8

METHOD FOR MAKING BY ASSEMBLING A TOOL TO AND IN A TOOL HOLDER, AND THE TOOL AND TOOL HOLDER, AND THE ASSEMBLED TOOL AND TOOL HOLDER

CONTINUING APPLICATION DATA

This application is a Continuation-In-Part application of International Patent Application No. PCT/IL2006/000352, filed on Mar. 19, 2006, which claims priority from Israel Patent Application No. 167735, filed on Mar. 29, 2005. International Patent Application No. PCT/IL2006/000352 was pending as of the filing date of this application. The United States was an elected state in International Patent Application No. PCT/IL2006/000352.

BACKGROUND

1. Technical Field

This application relates to a method for making by assembling a tool to and in a tool holder, and the tool and tool holder, and the assembled tool and tool holder.

2. Background Information

Rigid support of cutting tools held in machine tools such as lathes, milling machines, drilling machines, borers and the like is absolutely essential if good quality machining is to be carried out. Poorly supported tools will produce a poor surface finish, inadequate accuracy, unnecessary noise, low rates of metal removal, and lead to short tool life.

Machine tool spindles usually terminate in a tapered bore, so large end mills or other cutting tools having a tapered shank can be inserted directly into the spindle. Small and medium sized cutters are however inserted in a tool holder or in a clamping chuck which is rigidly, concentrically and removably assembled to the spindle end. To provide rigid support, the tool in turn must be firmly gripped by the tool holder, concentrically and yet removably so that the tool can be sharpened or replaced when worn.

With regard to firm gripping of the tool, an attractive method of execution is to insert the tool into its holder by shrink fit. This is achieved by either freezing the tool, or heating the tool holder, or both. The tool is then easily slid into its holder, and when both parts reach room temperature the tool is firmly gripped. This method has advantages in ensuring concentricity, and as the tool holder nose can be compactly designed, not requiring any moving parts such as chuck jaws. Tools held by shrink fit are known and can be seen in several U.S. patents, including U.S. Pat. Nos. 5,311,654, 5,979,912 and 6,234,729 to Cook, 6,260,858 to DeLucia, 6,315,506 to Mizoguchi, 6,511,077 to Voss et al., and 6,595,528 to Voss.

Tool rigidity can be further improved where a shoulder designed to abut the nose of the tool holder is provided on the cutting tool. Such shoulder can be produced by using a tool shank diameter smaller than the tool cutting diameter, or by providing a shoulder larger than the cutting tool diameter at the shank end adjacent to the cutting teeth.

To achieve an improvement in rigidity, said shoulder must be and remain, firmly in contact with the nose of the tool holder. It has however been found by experience that such contact is not assured where the cutting tool is held by a shrink fit. Whether or not the explanation for this offered by Cook in the foreword of U.S. Pat. No. 6,234,729 is correct or not, there is little doubt that the desired axial abutment between the tool shoulder and its holder is in practice unsatisfactory. In trying to deal with this problem, Voss et al. in U.S. Pat. No. 6,511,077 propose to add a chamfered ring to provide an abutting surface for the tool shoulder. The ring is however too thin to provide a satisfactory abutment surface, and its short length and tapered seat are not conducive to precise perpendicular alignment.

It should be noted that after the tool is gripped in a shrink fit, the application of axial pressure can not eliminate a small gap remaining between the abutment faces. Even assuming that a high axial force could overcome the shrink fit, a small gap could not be eliminated. This is because the metal will axially contract under such external force to bring the two abutment faces into contact. However, the moment the axial force is released, the metal springs back and the small gap appears once again. Thus there is a need for an methodology and system which provides an improved interface coupling between a tool and a tool holder.

OBJECT OR OBJECTS

An object of at least one possible embodiment of the present application is to teach a cutting tool assembly system in which a cutting or other tool component is mounted into a tool holder assembly in a manner to provide rigid support while being held in a machine tool spindle.

SUMMARY

A method and implementing system are provided in which a tool holder, which is arranged for removable connection to a machine tool spindle, includes a cylindrical bore of a first diameter terminating in an outer abutment face and configured to rigidly support a cutting tool having a substantially cylindrical shank of a second diameter slightly larger than said first diameter. The tool has a shoulder of a third diameter substantially larger than the first diameter disposed between the shank and the cutting teeth of the tool. The tool is assembled into the cylindrical bore of the tool holder when the tool holder is at a temperature substantially higher than the cylindrical shank. Means are provided to apply an axial force to the cutting tool to force the tool shoulder against said outer abutment face of the tool holder. The axial force and the shoulder contact between the tool holder and the cutting tool is maintained while the tool and the holder return to their normal working temperatures.

In one possible embodiment, there is provided a tool holder in combination with a cutting tool which, in turn, is provided with a central screw-threaded hole in the shank of the tool wherein an axial force is applied by means of a removable draw bolt insertable into the central screw-threaded hole in the shank.

In another embodiment there is provided a tool holder wherein the axial force is applied by means of a removable hydraulic cylinder provided with a connection engageable with the central screw-threaded hole in the tool shank.

In yet a further embodiment, the tool holder is used in combination with a cutting tool wherein the shoulder of a third diameter substantially larger than the first diameter is provided by the rear terminations of multiple cutting teeth forming a part of the cutting tool.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in greater detail below with reference to the accompanying drawings, in which:

FIG. 8 shows a schematic representation of an embodiment according to the present invention.

DESCRIPTION OF EMBODIMENT OR EMBODIMENTS

Figure 1:
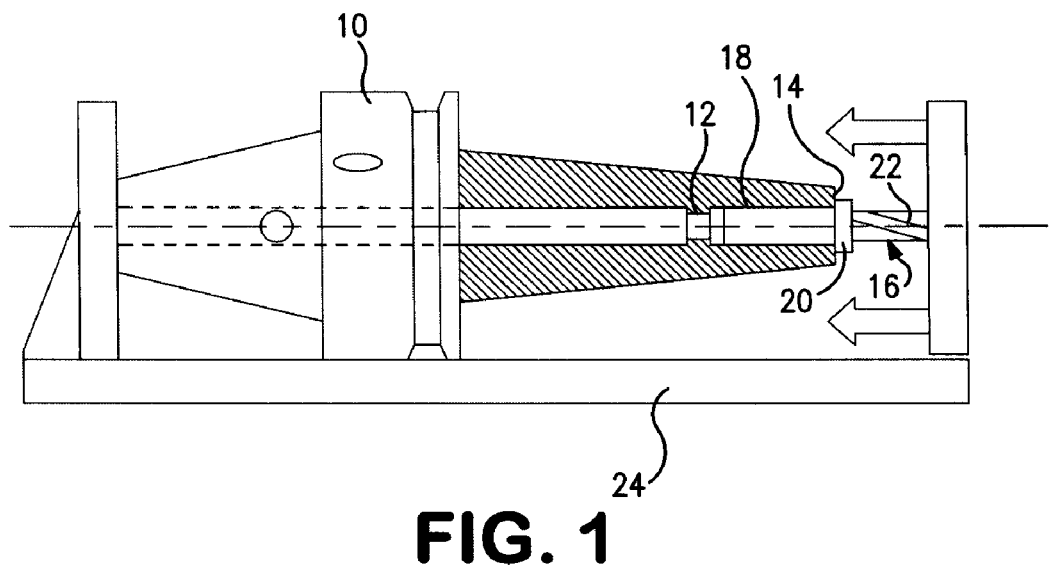
FIG. 1 is a partially sectioned view of one embodiment of a tool holder wherein axial pressure is provided by a press.

FIG. 1 shows a tool holder 10 arranged for removable connection to a machine tool spindle (not shown). The holder 10 has a cylindrical bore 12 of a first diameter terminating in an outer abutment face 14. The holder 10 rigidly supports an end mill tool 16 having a cylindrical shank 18 of a second diameter slightly larger than the first diameter 12, according to normal shrink-fit tolerances as specified, for example, in Standard ANSI B4.3-1978.

Some examples of shrink fits are as follows: where the diameter of the shank 18, in FIG. 1, is 0.001 to 0.0003 inches and/or 0.0005 to 0.0015 larger than the bore 12 at substantially room temperature.

The tool 16 has a shoulder 20 of a third diameter substantially larger than the first diameter bore 12. The shoulder 20 is disposed between the shank 18 and the cutting teeth 22 of the tool 16. The tool 16 is inserted into the cylindrical bore 12 when the tool holder 10 is at a temperature substantially higher than that of the cylindrical shank 18. A press 24 is seen applying an axial force on the cutting tool 16 to force the tool shoulder 20 against the outer abutment face 14 of the tool holder 10 while the two parts 10, 16 approach ambient temperature. As press pressure is maintained during the whole period during which the parts 10, 16 reach the same temperature, shoulder contact is maintained between outer abutment face 14 and the tool shoulder 20.

Figure 2:
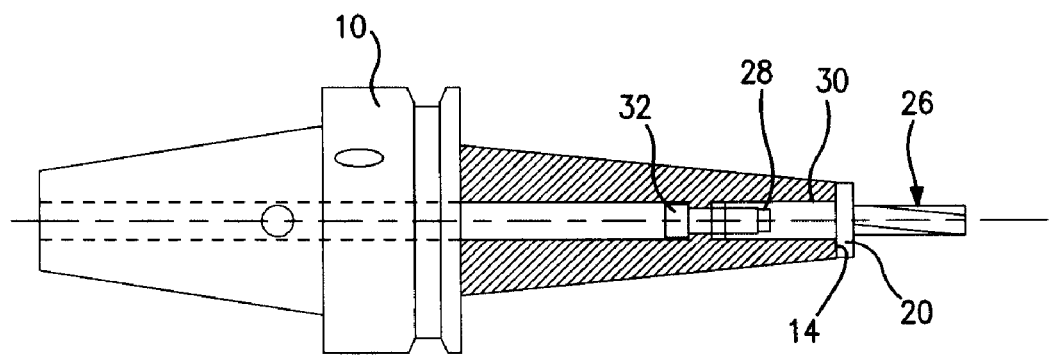
FIG. 2 is a partially sectioned view of a tool holder wherein axial pressure is provided by a screw.

Referring now to FIG. 2, there is seen the tool holder 10 in combination with an end mill cutting tool 26 provided with a central screw-threaded hole 28 in the shank 30 of the end mill 26. A socket-head cap screw 32 engages the hole 28 and draws the end mill 26 into the tool holder 10 so that the abutment surface of the end mill 26 and of the tool holder 10 remain in close contact. The screw 32 need not be removed even after starting machining.

Figure 3:
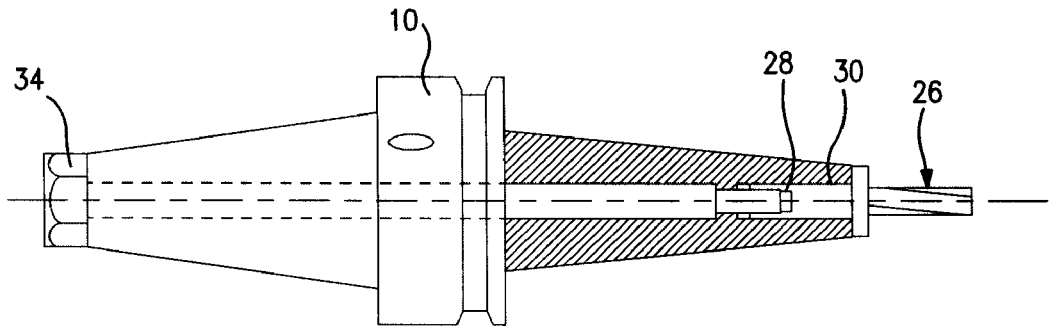
FIG. 3 is a partially sectioned view of another embodiment of the tool holder wherein axial pressure is provided by a draw bolt.

In FIG. 3, there is illustrated the tool holder 10 again holding an end mill 26 of the type seen in FIG. 2. An axial force is applied by means of a removable draw bolt 34 inserted into the central screw-threaded hole 28 in the shank 30 of the end mill 26. The draw bolt 34 easily maintains the axial force required because its length is elastically strained when tightened. The draw bolt 34 is readily tightened and removed after the shrink fit grips the end mill 26.

Figure 4:
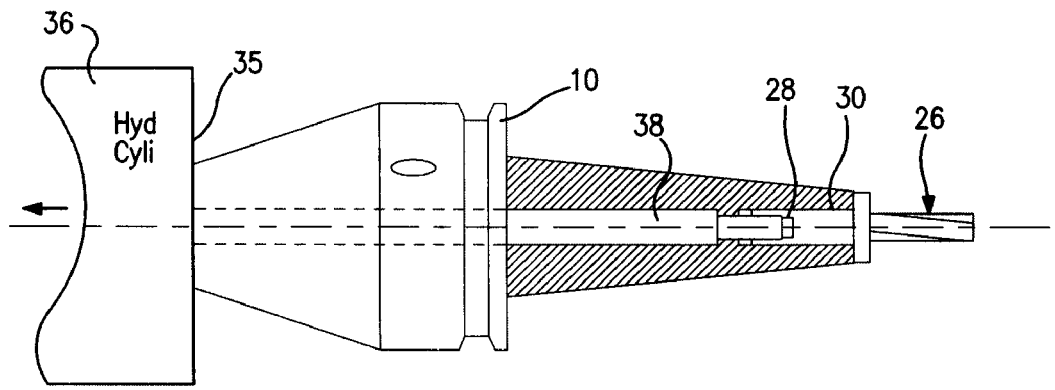
FIG. 4 is still another partially sectioned view of a tool holder wherein axial pressure is provided by a hydraulic cylinder.

In FIG. 4, a tool holder 10 is shown wherein the axial force is applied by means of a removable hydraulic cylinder 36 provided with a connection 38 engageable with the central screw-threaded hole 28 in the shank 30 of the end mill 26. The hydraulic cylinder 36 provides a shoulder 35 which restrains the tool holder 10 when tension is applied to the end mill 26. The cylinder 36 is of course removed before the tool holder is put into use.

Figure 5:
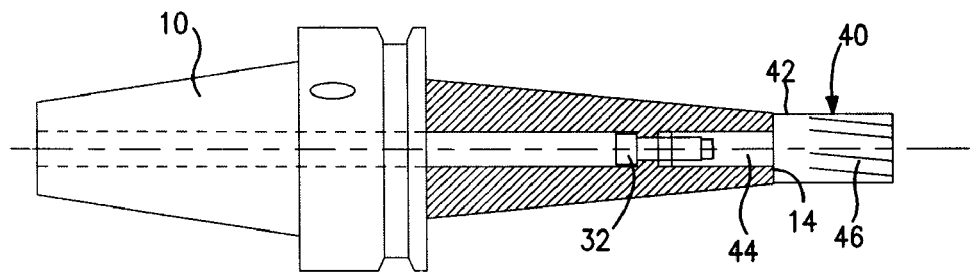
FIG. 5 is a partially sectioned view of an embodiment of the tool holder wherein an end mill provides the shoulder to retain contact with the tool holder.

Referring now to FIG. 5, there is again depicted the tool holder 10 in combination with an end mill cutting tool 40. The shoulder 42 of a third diameter is substantially larger than the diameter of the end mill shank 44. Thus the rear terminations of multiple cutting teeth 46 forming a part of the cutting tool 40 provides the shoulder which is to contact the abutment face 14 of the tool holder 10.

Figure 6:
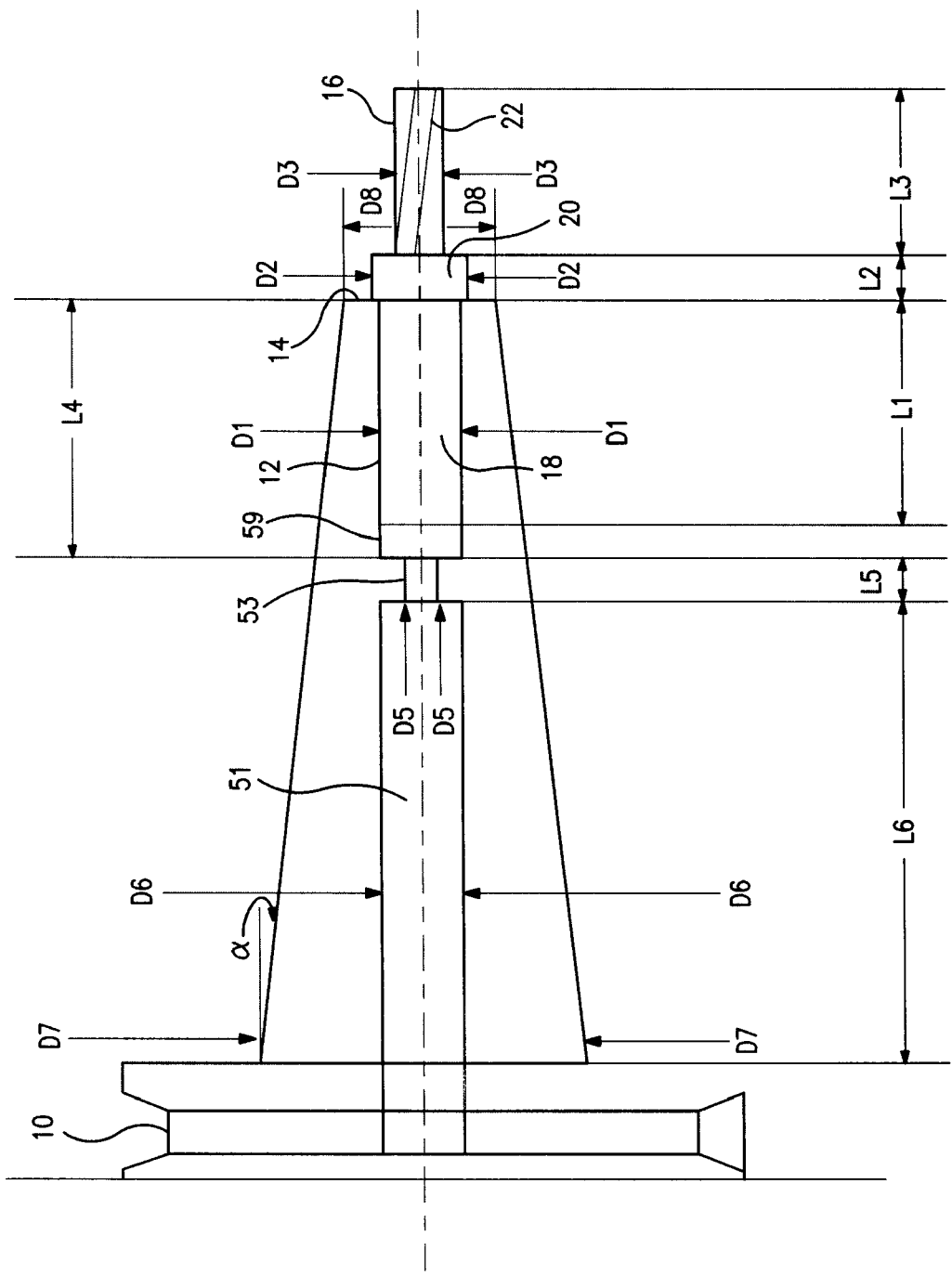
FIG. 6 shows an enlarged section of one possible embodiment of a tool holder, indicating diameters and lengths.

FIG. 6 shows the tool holder 10 in combination with the tool 16. D1 indicates the diameter of the tool shank 18; D2 indicates the diameter of tool shoulder 20; D3 indicates the diameter of the tool 16; D5 indicates the diameter of an additional cylindrical inner space 53 of the tool holder 10; D6 indicates the diameter of a cylindrical inner chamber 51 of the tool holder 10; D7 indicates the diameter of the tool holder 10 at a point away from the outer abutment face 14; and D8 indicates the diameter of the tool holder 10 at the outer abutment face 14. As shown in FIG. 6, angle $\alpha$ represents an angle of approximately 5.5 degrees. In other possible embodiments, angle $\alpha$ could be up 50% less or up to 100% of this angle, as shown in FIG. 6, and could vary in increments of 1% in this range and even extending outside of this range in 1% increments. In FIG. 6, L1 indicates the length of the tool shank 18; L2 indicates the length of the tool shoulder 20; L3 indicates the length of the tool 16; L4 indicates the length of the bore 12; L5 indicates the length of the cylindrical inner space 53 of the tool holder 10; and L6 indicates the length of the cylindrical inner chamber 51 of the tool holder 10. The following ratios apply to the diameters D1-D7, as shown in FIG. 6: D2/D1=1.27; D3/D2=0.57; D6/D5=2.14; and D7/D6=3.47. The following ratios apply to the lengths L1-L6, as shown in FIG. 6: L2/L1=0.17; L3/L2=0.24; L5/L4=0.20; and L6/L5=9.38. In other possible embodiments, these ratios could be up 50% less or up to 100% of these ratios, as shown in FIG. 6, and could vary in increments of 1% in this range and even extending outside of this range in 1% increments.

Figure 7:
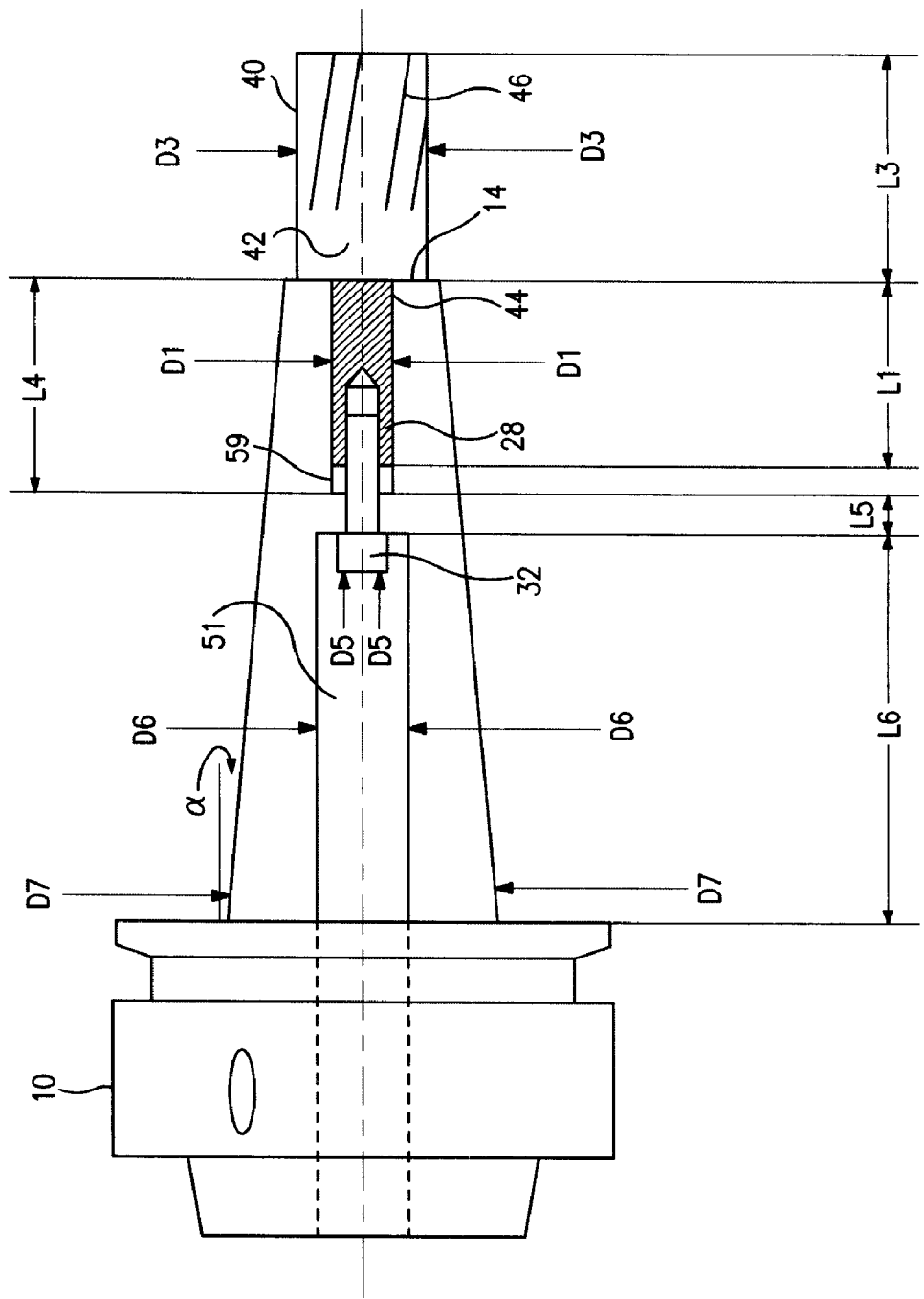
FIG. 7 shows an enlarged section of one possible embodiment of a tool holder, indicating diameters and lengths.

FIG. 7 shows the tool holder 10 in combination with the end mill cutting tool 40. D1 indicates the diameter of the end mill shank 44; D3 indicates the diameter of the cutting tool 40; D5 indicates the diameter of the socket-head cap screw 32; D6 indicates the diameter of the cylindrical inner chamber 51 of the tool holder 10; and D7 indicates the diameter of the tool holder 10 at a point away from the outer abutment face 14. As shown in FIG. 7, angle .alpha. represents an angle of approximately 5.5 degrees. In other possible embodiments, angle .alpha. could be up 50% less or up to 100% of this angle, as shown in FIG. 7, and could vary in increments of 1% in this range and even extending outside of this range. In FIG. 7, L1 indicates the length of the end mill shank 44; L3 indicates the length of the end mill cutting portion; L4 indicates the length of the central screw-threaded hole 28; L5 indicates an additional length of the central screw-threaded hole 28; and L6 indicates the length of cylindrical inner chamber 51 of the tool holder 10. The following ratios apply to the diameters D1 to D7, as shown in FIG. 7: D3/D1=2.11; D5/D3=0.37; D6/D5=1.71; and D7/D6=3.08. The following ratios apply to the lengths L1-L6, as shown in FIG. 7: L3/L1=1.24; L4/L3=0.94; L5/L4=0.21; and L6/L5=9.17. In other possible embodiments, these ratios could be up 50% less or up to 100% of these ratios, as shown in FIG. 7, and could vary in increments of 1% in this range and even extending outside of this range in 1% increments.

The scope of the present application is intended to include all embodiments coming within the meaning of the following claims. The foregoing examples illustrate useful forms of the present application, but are not to be considered as limiting its scope, as those skilled in the art will be aware that additional variants and modifications of the present application can readily be formulated without departing from the meaning of the following claims. Accordingly, the present application is not intended to be limited to the specific form set forth herein, but on the contrary, it is intended to cover such alternatives, modifications, and equivalents, as can be reasonably included within the spirit and scope of the application.

One feature or aspect of an embodiment is believed at the time of the filing of this patent application to possibly reside broadly in a tool holder for removable connection to a machine tool spindle, said holder having a cylindrical bore of a first diameter terminating in an outer abutment face and configured to rigidly support a cutting tool having a substantially cylindrical shank of a second diameter slightly larger than said first diameter, said tool having a shoulder of a third diameter substantially larger than said first diameter disposed between said shank and the cutting teeth of said tool, said tool being assembled into said cylindrical bore of said tool holder when said tool holder is at a temperature substantially higher than said cylindrical shank, means being provided to apply an axial force on said cutting tool to force said tool shoulder against said outer abutment face of said tool holder, shoulder contact between said tool holder and said cutting tool being maintained also after said tool and said holder revert to their normal working temperatures.

Another feature or aspect of an embodiment is believed at the time of the filing of this patent application to possibly reside broadly in the tool holder in combination with a cutting tool provided with a central screw-threaded hole in said shank.

Yet another feature or aspect of an embodiment is believed at the time of the filing of this patent application to possibly reside broadly in the tool holder, wherein said axial force is applied by means of a removable draw bolt insertable into said central screw-threaded hole in said shank.

Still another feature or aspect of an embodiment is believed at the time of the filing of this patent application to possibly reside broadly in the tool holder, wherein said axial force is applied by means of a removable or internal hydraulic cylinder provided with a connection engageable with said central screw-threaded hole in said shank or other types of connection between said hydraulic cylinder and said tool shank.

A further feature or aspect of an embodiment is believed at the time of the filing of this patent application to possibly reside broadly in the tool holder in combination with a cutting tool, wherein said shoulder of a third diameter substantially larger than said first diameter is provided by the rear terminations of multiple cutting teeth forming a part of said cutting tool.

Another feature or aspect of an embodiment is believed at the time of the filing of this patent application to possibly reside broadly in a method for assembling a tool to a tool holder, said tool holder having a cylindrical bore of a first diameter at a first predetermined temperature terminating in an radially disposed outer abutment face and configured to support a tool having a substantially cylindrical shank of a second diameter, said second diameter being sufficiently larger than said first diameter at said first predetermined temperature to provide a shrink-fit between said tool and said tool holder in use, said tool further comprising a radially disposed shoulder portion having a third diameter substantially larger than said second diameter of said shank, said radially disposed shoulder portion of said tool configured to abut said radially disposed outer abutment face of said tool holder, said shoulder portion having a longitudinal length, along a common central axis of said tool, being sufficient to maintain a sufficient axial force between said cylindrical shank of said tool and said cylindrical bore of said tool holder during assembly to provide and maintain sufficient engagement between said shoulder portion and said outer abutment face during operation of said tool holder and said tool, said method comprising: positioning said tool and said tool holder along said common central axis; heating said tool holder to a second predetermined temperature, said second predetermined temperature being higher than a predetermined temperature of said tool to permit said cylindrical shank to be inserted in said cylindrical bore of said tool holder; assembling said tool into said tool holder wherein said cylindrical shank of said tool is fitted into said cylindrical bore of said tool holder; applying a sufficient axial force along said common central axis to force said cylindrical shank of said tool into a forced engagement with said cylindrical bore of said tool holder; maintaining a sufficient engaging force between said outer abutment face of said tool holder and said shoulder portion of said tool to provide and maintain a shrink-fit during use of said tool between said tool and said tool holder upon termination of the assembly of said tool and said tool holder; and allowing at least said tool holder and, optionally, said cylindrical shank of said tool, to cool to a third predetermined temperature, while maintaining said sufficient axial force between said cylindrical shank of said tool and said cylindrical bore of said tool holder to provide a shrink-fit between said tool and said tool holder and to maintain a sufficient force between said outer abutment face of said tool holder and said shoulder portion of said tool to permit use of said tool in said tool holder during operation.

Yet another feature or aspect of an embodiment is believed at the time of the filing of this patent application to possibly reside broadly in the method, wherein said tool is a cutting tool having a shank at one end thereof, said cutting tool being provided with a central screw-threaded hole in said shank, said method further including using said screw-threaded hole in providing said axial force with an arrangement comprising a threaded portion being configured to screw into said central screw-threaded hole in said shank.

Still another feature or aspect of an embodiment is believed at the time of the filing of this patent application to possibly reside broadly in the method, wherein said arrangement comprising a removable draw bolt and further including applying said axial force by turning and securing said removable draw bolt inserted into said central screw-threaded hole in said shank.

A further feature or aspect of an embodiment is believed at the time of the filing of this patent application to possibly reside broadly in the method, wherein said arrangement comprising a removable hydraulic cylinder; said removable hydraulic cylinder comprising a threaded portion configured to thread into said central screw-threaded hole in said shank; and applying said axial force with said threaded portion of said removable hydraulic cylinder to provide a connection engageable with said central screw-threaded hole in said shank.

Another feature or aspect of an embodiment is believed at the time of the filing of this patent application to possibly reside broadly in the method, wherein said arrangement comprising an internal hydraulic cylinder; applying said axial force with said internal hydraulic cylinder to provide a connection engageable with said central screw-threaded hole in said shank.

Yet another feature or aspect of an embodiment is believed at the time of the filing of this patent application to possibly reside broadly in the method, wherein said tool is a cutting tool having a shoulder of a third diameter substantially larger than said first diameter, said shoulder being disposed between said multiple cutting teeth of said cutting tool and said outer abutment face.

Still another feature or aspect of an embodiment is believed at the time of the filing of this patent application to possibly reside broadly in the method, wherein said tool further comprising a cutting portion disposed adjacent said shoulder portion of said tool, opposite said cylindrical shank of said tool, having one of (A) and (B), wherein: (A) a diameter substantially less than the diameter of said shoulder portion; and (B) a diameter substantially the same as the diameter of said shoulder portion.

A further feature or aspect of an embodiment is believed at the time of the filing of this patent application to possibly reside broadly in the method, wherein said cutting portion having a diameter substantially the same as the diameter of said cylindrical shank.

Another feature or aspect of an embodiment is believed at the time of the filing of this patent application to possibly reside broadly in A method for assembling a tool to a tool holder, said tool holder having a cylindrical bore of a first diameter at a first predetermined temperature terminating in an outer abutment face and configured to support a tool having a substantially cylindrical shank of a second diameter, said second diameter being sufficiently larger than said first diameter at said first predetermined temperature to provide a shrink-fit between said tool and said tool holder in use, said tool further comprising a shoulder portion having a third diameter substantially larger than said second diameter of said shank, said shoulder portion of said tool configured to abut said outer abutment face of said tool holder, said shoulder portion having a longitudinal length, along a common central axis of said tool, being sufficient to maintain a sufficient axial force between said cylindrical shank of said tool and said cylindrical bore of said tool holder during assembly to provide and maintain sufficient engagement between said shoulder portion and said outer abutment face during operation of said tool holder and said tool, said method comprising: positioning said tool and said tool holder along said common central axis; changing the temperature of at least one of said tool and said tool holder to a second predetermined temperature, said second predetermined temperature being substantially different than the first predetermined temperature of said tool or said tool holder to permit said cylindrical shank to be inserted in said cylindrical bore of said tool holder; assembling said tool into said tool holder, wherein said cylindrical shank of said tool is disposed in said cylindrical bore of said tool holder; applying a sufficient axial force along said common central axis to introduce said cylindrical shank of said tool into engagement with said cylindrical bore of said tool holder; maintaining a sufficient engaging force between said outer abutment face of said tool holder and said shoulder portion of said tool to provide and maintain a shrink-fit during use of said tool between said tool and said tool holder upon termination of the assembly of said tool and said tool holder; and allowing at least one of said tool holder and said tool to change temperature to a third predetermined temperature, while maintaining said sufficient axial force between said tool and said cylindrical bore of said tool holder to provide a shrink-fit between said tool and said tool holder in use.

Yet another feature or aspect of an embodiment is believed at the time of the filing of this patent application to possibly reside broadly in the method, wherein said tool is a cutting tool having a shank at one end thereof, said cutting tool being provided with a central screw-threaded hole in said shank, said method further including using said screw-threaded hole in providing said axial force with an arrangement comprising a threaded portion being configured to screw into said central screw-threaded hole in said shank; and said arrangement comprising one of (A), (B), and (C), wherein: (A) a removable draw bolt and further including applying said axial force by turning and securing said removable draw bolt inserted into said central screw-threaded hole in said shank; (B) a removable hydraulic cylinder comprising a threaded portion configured to thread into said central screw-threaded hole in said shank; and applying said axial force with said threaded portion of said removable hydraulic cylinder to provide a connection engageable with said central screw-threaded hole in said shank; and (C) an internal hydraulic cylinder comprising a threaded portion configured to thread into said central screw-threaded hole in said shank; and applying said axial force with said internal hydraulic cylinder to provide a connection engageable with said central screw-threaded hole in said shank.

Still another feature or aspect of an embodiment is believed at the time of the filing of this patent application to possibly reside broadly in the method, wherein said tool is a cutting tool and said shoulder portion being disposed between said multiple cutting teeth of said cutting tool and said outer abutment face; and said tool further comprising a cutting portion disposed adjacent said shoulder portion of said tool, opposite said cylindrical shank of said tool, having one of: a diameter substantially less than the diameter of said shoulder portion; and a diameter substantially the same as the diameter of said shoulder portion.

A further feature or aspect of an embodiment is believed at the time of the filing of this patent application to possibly reside broadly in the method, wherein said cutting portion having a diameter substantially the same as the diameter of said cylindrical shank.

Another feature or aspect of an embodiment is believed at the time of the filing of this patent application to possibly reside broadly in a tool in a tool holder, said tool holder having a cylindrical bore of a first diameter at a first predetermined temperature terminating in an outer abutment face and configured to support a tool having a substantially cylindrical shank of a second diameter; said second diameter being sufficiently larger prior to assembly than said first diameter at said first predetermined temperature to then provide a shrink-fit between said tool and said tool holder in use; said tool further comprising a shoulder portion having a third diameter substantially larger than said second diameter of said shank; said shoulder portion of said tool being configured and disposed to abut said outer abutment face of said tool holder; said shoulder portion having a longitudinal length, along a common central axis of said tool, being configured and disposed to sufficiently maintain a sufficient axial force between said cylindrical shank of said tool and said cylindrical bore of said tool holder during assembly and to provide and maintain sufficient engagement between said shoulder portion and said outer abutment face during operation of said tool holder and said tool; said cylindrical shank of said tool being disposed in said cylindrical bore of said tool holder; said tool and said tool holder being configured to accept application of a sufficient axial force along said common central axis to introduce said cylindrical shank of said tool into engagement with said cylindrical bore of said tool holder during assembly; said tool and said tool holder being configured to accept a sufficient engaging force between said outer abutment face of said tool holder and said shoulder portion of said tool to provide and maintain a shrink-fit during use of said tool between said tool and said tool holder upon termination of the assembly of said tool and said tool holder; and said tool holder and said tool being configured to change temperature to a third predetermined temperature, while maintaining said sufficient axial force between said tool and said cylindrical bore of said tool holder to provide a shrink-fit between said tool and said tool holder in use.

Yet another feature or aspect of an embodiment is believed at the time of the filing of this patent application to possibly reside broadly in the tool, wherein said tool is a cutting tool comprising a shank at one end thereof; said cutting tool having a central screw-threaded hole in said shank; said screw-threaded hole being configured to accept an arrangement to apply said axial force; said arrangement comprising a threaded portion being configured to screw into said central screw-threaded hole in said shank; and said arrangement comprising one of (A), (B), and (C), wherein: (A) a removable draw bolt being configured to be inserted into said central screw-threaded hole in said shank; said removable draw bolt further being configured to turn and to tighten into said central screw-threaded hole in said shank; (B) a removable hydraulic cylinder comprising a threaded portion being configured to be threaded into said central screw-threaded hole in said shank; and (C) an internal hydraulic cylinder comprising a threaded portion being configured to thread into said central screw-threaded hole in said shank; and said shoulder portion being disposed between said multiple cutting teeth of said cutting tool and said outer abutment face; and said tool further comprising a cutting portion disposed adjacent said shoulder portion of said tool, opposite said cylindrical shank of said tool, having one of (D) and (E), wherein: (D) a diameter substantially less than the diameter of said shoulder portion; and (E) a diameter substantially the same as the diameter of said shoulder portion.

Still another feature or aspect of an embodiment is believed at the time of the filing of this patent application to possibly reside broadly in the tool, wherein said cutting portion having a diameter substantially the same as the diameter of said cylindrical shank.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following patents, patent applications or patent publications: US 2003/0075879 A1, U.S. Pat. No. 6,394,466 B1, and U.S. Pat. No. 5,873,687 A, were cited in the International Search Report dated Nov. 7, 2006, and/or cited elsewhere, and are hereby incorporated by reference as if set forth in their entirety herein.

The corresponding foreign and international patent publication applications, namely, Israel Patent Application No. 167735, filed on Mar. 29, 2005, having inventor Vladimir VOLOKH, and International Application No. PCT/IL2006/000352, filed on Mar. 19, 2006, having WIPO Publication No. WO2006/103651 A2 and inventor Vladimir VOLOKH, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in Israel and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A tool in a tool holder, said tool holder having a cylindrical bore of a first diameter at a first predetermined temperature terminating in an outer abutment face, the tool holder configured to support a tool having a substantially cylindrical shank of a second diameter;

said second diameter being sufficiently larger prior to assembly than said first diameter at said first predetermined temperature to then provide a shrink-fit between said tool and said tool holder in use;

said tool further comprising a shoulder portion having a third diameter substantially larger than said second diameter of said shank;

said shoulder portion of said tool being configured and disposed to abut said outer abutment face of said tool holder;

said shoulder portion having a longitudinal length, along a common central axis of said tool, being configured and disposed to sufficiently maintain an axial force between said cylindrical shank of said tool and said cylindrical bore of said tool holder after assembly of the tool and tool holder, and to provide and maintain engagement between said shoulder portion and said outer abutment face during operation of said tool holder and said tool;

said cylindrical shank of said tool being disposed in said cylindrical bore of said tool holder;

said tool and said tool holder being configured to accept application of a sufficient axial force along said common central axis to introduce said cylindrical shank of said tool into engagement with said cylindrical bore of said tool holder during assembly;

said tool and said tool holder being configured to accept a sufficient engaging force between said outer abutment face of said tool holder and said shoulder portion of said tool to provide and maintain a shrink-fit during use of said tool between said tool and said tool holder upon termination of the assembly of said tool and said tool holder;

said tool holder and said tool being configured to change temperature to a second predetermined temperature, while maintaining said axial force between said tool and said cylindrical bore of said tool holder to provide a shrink-fit between said tool and said tool holder in use;

said cylindrical shank of said tool has a central screw-threaded hole therein; and said axial force being applied by an arrangement comprising a removable draw bolt having one end that screws into said screw-threaded hole, wherein the tool holder, on the end thereof opposite the outer abutment face, terminates in a drawbolt abutment face, wherein the end of the drawbolt opposite said one end has a head having an abutment face that abuts the drawbolt abutment face.

2. The tool according to claim 1 wherein said tool is a cutting tool; and said shoulder portion being disposed between cutting teeth of said cutting tool and said outer abutment face; and said tool further comprising a cutting portion including the cutting teeth, disposed adjacent said shoulder portion of said tool, opposite said cylindrical shank of said tool, having one of (D) and (E), wherein:
(D) a diameter substantially less than the diameter of said shoulder portion; and
(E) a diameter substantially the same as the diameter of said shoulder portion.

3. The tool according to claim 2, wherein said cutting portion has a diameter substantially the same as the diameter of said cylindrical shank.

4. A tool holder for removable connection to a machine tool spindle, said tool holder having a cylindrical bore of a first diameter terminating in an outer abutment face and configured to rigidly support a cutting tool having a substantially cylindrical shank of a second diameter slightly larger than said first diameter, said cylindrical bore having a central axis, said tool having a shoulder of a third diameter substantially larger than said first diameter disposed between said shank and cutting teeth of said tool, said tool being assembled into said cylindrical bore of said tool holder when said tool holder is at a temperature substantially higher than said cylindrical shank, means being provided to apply an axial force on said cutting tool to force said tool shoulder against said outer abutment face of said tool holder, said means including a removable draw bolt, shoulder contact between said tool holder and said cutting tool being maintained also after said tool and said holder revert to their normal working temperatures, the tool holder being in combination with the cutting tool, the cutting tool being provided with a central screw-threaded hole in said shank, the removable drawbolt having one end that screws into said screw-threaded hole, and the tool holder, on the end thereof opposite the outer abutment face, terminates in a drawbolt abutment face, wherein the end of the drawbolt opposite said one end has a head having an abutment face that abuts the drawbolt abutment face.

5. The tool holder according to claim 4, wherein said removable draw bolt is configured to be elastically strained when tightened.

* * * * *